(12) United States Patent
Kagawa et al.

(10) Patent No.: US 10,777,105 B2
(45) Date of Patent: Sep. 15, 2020

(54) MOVABLE BODY AND ADVERTISEMENT PROVIDING METHOD

(71) Applicant: TOYOTA JIDOSHA KABUSHIKI KAISHA, Toyota-shi, Aichi-ken (JP)

(72) Inventors: Kazuyuki Kagawa, Nisshin (JP); Naomi Kataoka, Nagoya (JP); Toshiaki Niwa, Okazaki (JP); Yasuhiro Baba, Kamo-gun (JP); Katsuhiko Yourou, Toyonaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 59 days.

(21) Appl. No.: 16/150,967

(22) Filed: Oct. 3, 2018

(65) Prior Publication Data

US 2019/0130800 A1    May 2, 2019

(30) Foreign Application Priority Data

Nov. 2, 2017  (JP) .................................. 2017-212774

(51) Int. Cl.

| | |
|---|---|
| *G06Q 30/00* | (2012.01) |
| *G09F 21/04* | (2006.01) |
| *G06Q 30/02* | (2012.01) |
| *G09F 27/00* | (2006.01) |
| *G09F 19/12* | (2006.01) |
| *G09F 7/00* | (2006.01) |
| *B60W 10/04* | (2006.01) |
| *B60W 10/18* | (2012.01) |
| *G05D 1/02* | (2020.01) |

(Continued)

(52) U.S. Cl.
CPC ....... *G09F 21/048* (2013.01); *G06Q 30/0265* (2013.01); *G09F 27/005* (2013.01); *B60W 10/04* (2013.01); *B60W 10/18* (2013.01); *B60W 10/20* (2013.01); *B60W 30/12* (2013.01); *B60W 2420/42* (2013.01); *B60W 2420/52* (2013.01); *G05D 1/0257* (2013.01); *G05D 1/0278* (2013.01); *G09F 19/12* (2013.01); *G09F 2007/007* (2013.01)

(58) Field of Classification Search
None
See application file for complete search history.

(56) References Cited

U.S. PATENT DOCUMENTS 10,112,528 B1 * 10/2018 Mazuir ................. B60Q 1/503
10,233,021 B1 *  3/2019 Brady .................... G06Q 50/30

(Continued)

FOREIGN PATENT DOCUMENTS

JP        2001-001787 A       1/2001

OTHER PUBLICATIONS

STIC EIC 3600 Search Report for U.S. Appl. No. 16/150,967 dated Mar. 2020 (Year: 2020).*

*Primary Examiner* — Matthew T Sittner
(74) *Attorney, Agent, or Firm* — Sughrue Mion, PLLC (57) ABSTRACT

A vehicle is a movable body capable of traveling in a driver-operated mode and traveling in a driverless mode, and includes an advertisement display device and a controller. The advertisement display device is configured to switch between a first state to provide an advertisement outside of the vehicle and a second state to provide no advertisement outside of the vehicle. The controller is configured to control the advertisement display device to enter the first state during traveling in the driverless mode.

5 Claims, 7 Drawing Sheets

(51) Int. Cl.
*B60W 30/12* (2020.01)
*B60W 10/20* (2006.01)

(56) References Cited

U.S. PATENT DOCUMENTS

| | | | | |
|---|---|---|---|---|
| 2004/0111938 | A1* | 6/2004 | Ozawa | G09F 21/04 |
| | | | | 40/591 |
| 2013/0238440 | A1* | 9/2013 | Chatterjee | G06Q 30/02 |
| | | | | 705/14.62 |
| 2013/0307706 | A1* | 11/2013 | Kriezman | B60Q 1/503 |
| | | | | 340/988 |
| 2015/0105960 | A1* | 4/2015 | Pilutti | B60W 50/14 |
| | | | | 701/23 |
| 2015/0202770 | A1* | 7/2015 | Patron | G05D 1/024 |
| | | | | 700/245 |
| 2015/0283939 | A1* | 10/2015 | Parkes | G09F 21/04 |
| | | | | 340/468 |
| 2015/0348112 | A1* | 12/2015 | Ramanujam | G06Q 30/0266 |
| | | | | 705/14.63 |
| 2016/0121805 | A1* | 5/2016 | Forsgren | B60R 21/02 |
| | | | | 348/837 |
| 2016/0311323 | A1* | 10/2016 | Lee | B60K 35/00 |
| 2017/0142470 | A1* | 5/2017 | Tsuchida | H04N 21/422 |
| 2017/0309072 | A1* | 10/2017 | Li | G06F 3/0488 |
| 2018/0007414 | A1* | 1/2018 | Li | G09F 21/04 |
| 2018/0053215 | A1* | 2/2018 | e Costa | G06Q 30/0266 |
| 2018/0170392 | A1* | 6/2018 | Yang | B60W 40/09 |
| 2018/0216958 | A1* | 8/2018 | Park | G01C 21/3608 |
| 2018/0301117 | A1* | 10/2018 | Mourou | G09G 5/14 |
| 2019/0034967 | A1* | 1/2019 | Ferguson | G01C 21/3438 |
| 2019/0130800 | A1* | 5/2019 | Kagawa | G09F 27/005 |
| 2020/0118172 | A1* | 4/2020 | Jaegal | G06T 19/006 |

* cited by examiner

MOVABLE BODY AND ADVERTISEMENT PROVIDING METHOD

This nonprovisional application is based on Japanese Patent Application No. 2017-212774 filed on Nov. 2, 2017, with the Japan Patent Office, the entire contents of which are hereby incorporated by reference.

BACKGROUND

Field

The present disclosure relates to a movable body and an advertisement providing method. In particular, the present invention relates to a movable body capable of traveling in a driver-operated mode and a driverless mode, and an advertisement providing method utilizing the movable body.

Description of the Background Art

Vehicles capable of driving without a driver have been proposed, in which driving operations such as acceleration/deceleration and steering of vehicles are performed without driver's driving operations. For example, Japanese Patent Laying-Open No. 2001-1787 discloses a vehicle capable of traveling with an occupant and traveling without an occupant.

In recent years, development of automated driving techniques has been progressed rapidly against a backdrop of progress in computer technologies, and various types of services utilizing a movable body capable of driving without a driver have been under study. In the following, the term "driverless driving" means that a vehicle can be driven without a driver's driving operation, which may include that there is an occupant in the vehicle.

In a conceivable example of the service utilizing a movable body capable of driverless driving, a vehicle capable of driverless driving is dispatched to a user, and the user utilizes the vehicle to a destination (e.g., a station) and then deadheads the vehicle to a waiting area by driverless driving. However, traveling by driverless driving, such as deadheading of a vehicle, is merely traveling to return to a waiting area are or the like, leading to a desire to effectively utilize a movable body during driverless driving.

SUMMARY

The present disclosure has been made to solve the foregoing problem and has an object to effectively utilize, in a movable body capable of traveling in a driver-operated mode and traveling in a driverless mode, the movable body during traveling in the driverless mode.

A movable body of the present disclosure is a movable body capable of traveling in a driver-operated mode and traveling in a driverless mode, and includes an advertisement providing device and a controller. The advertisement providing device is configured to switch between a first state to provide an advertisement to the outside of the movable body and a second state to provide no advertisement to the outside of the movable body. The controller is configured to control the advertisement providing device to enter the first state during traveling in the driverless mode.

The movable body provides an advertisement to the outside of the movable body by the advertisement providing device during traveling in the driverless mode, thus allowing the movable body traveling in the driverless mode to be effectively utilized as an advertisement medium.

The first state may be a sate in which an advertisement is displayed on a windowpane of the movable body, and the second state may be a state in which no advertisement is displayed on a windowpane of the movable body. The controller may be configured to control the advertisement providing device to enter the second state during traveling in the driver-operated mode.

Displaying an advertisement on a windowpane of the movable body as described above allows an advertisement to be displayed large in a conspicuous place of the movable body, leading to a profound advertisement effect. In contrast, display of an advertisement by the advertisement providing device is prohibited during traveling in the driver-operated mode, which does not inhibit traveling in the driver-operated mode by the driver.

The controller may be configured to control the advertisement providing device to enter the first state when an occupant of the movable body requests the advertisement providing device to provide an advertisement during traveling in the driverless mode.

The intention of a user riding on the movable body traveling in the driverless mode can accordingly be reflected on display of an advertisement using a movable body during the driverless mode.

The controller may control the advertisement providing device to enter the first state so as to provide an advertisement for a commercial area when the movable body travels a predetermined commercial area in the driverless mode.

The controller may control the advertisement providing device to enter the first state so as to provide an advertisement for a housing area when the movable body travels a predetermined housing area in the driverless mode.

An advertisement with a profound advertising effect can accordingly be provided in an area (commercial area/housing area) in which the movable body travels in the driverless mode.

An advertisement providing method of the present disclosure is an advertisement providing method using a movable body capable of traveling in a driver-operated mode and traveling in a driverless mode. The movable body is configured to switch between a first state to provide an advertisement to the outside of the movable body and a second state to provide no advertisement to the outside of the movable body. The advertisement providing method includes controlling the movable body to enter the first state during traveling in the driverless mode, and controlling the movable body to enter the second state during traveling in the driver-operated mode.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions are given the same reference characters and are not described repeatedly.

<System Configuration>

Figure 1:
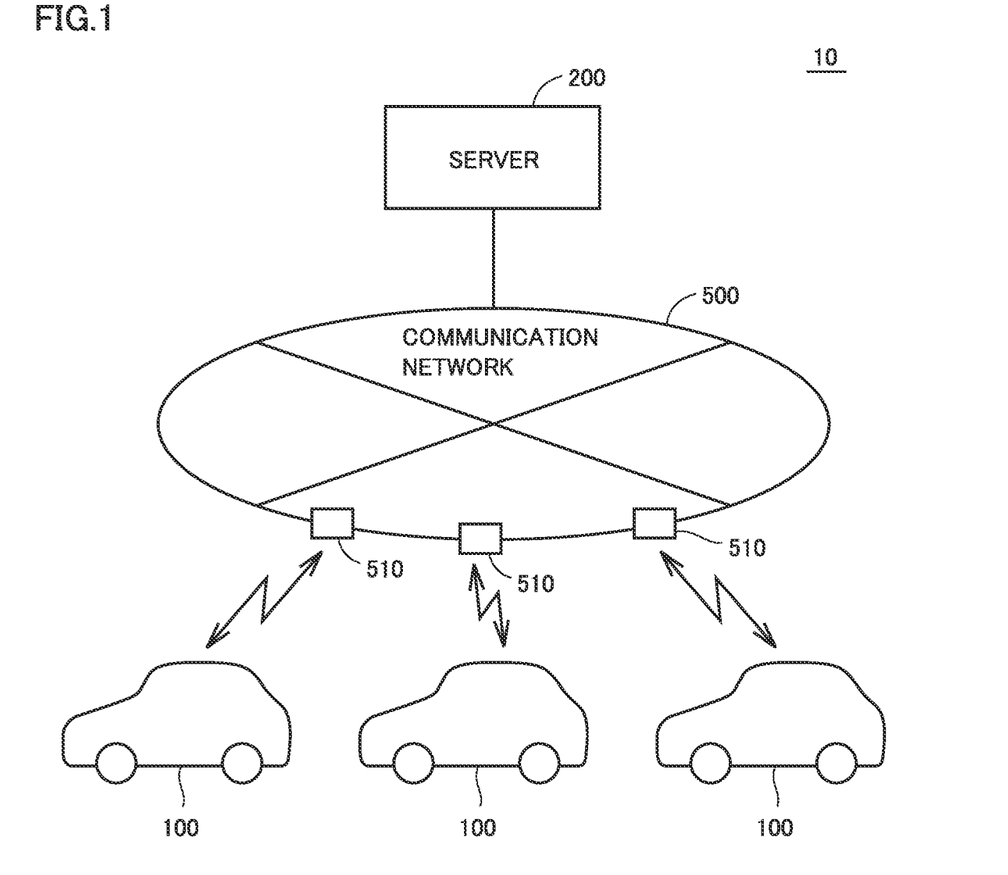
FIG. 1 schematically shows an entire configuration of an advertisement providing system using a movable body according to the present embodiment.

FIG. 1 schematically shows an entire configuration of an advertisement providing system 10 using a movable body according to the present embodiment. With reference to FIG. 1, advertisement providing system 10 includes a plurality of electrically powered vehicles (hereinafter, also simply referred to as "vehicles") 100 and a server 200. Each of vehicles 100 and server 200 are configured to communicate with each other through a communication network 500 such as the Internet or a telephone line. It should be noted that each vehicle 100 is configured to send and receive information to and from a base station 510 of communication network 500 through wireless communication.

Vehicle 100 is configured to generate driving power for traveling using electric power from a power storage device mounted thereon as described later with reference to FIG. 2. In the present embodiment, vehicle 100 is further configured to allow the power storage device to be charged using electric power supplied from a power supply external to the vehicle, and vehicle 100 is an electric vehicle, a so-called plug-in hybrid vehicle, or the like, for example. It should be noted that vehicle 100 is not necessarily limited to such a vehicle having a power storage device that can be charged using a power supply external to the vehicle, and may be a hybrid vehicle that does not have a function of charging the power storage device using a power supply external to the vehicle.

Vehicle 100 is also configured to perform driverless driving, and can perform traveling in a driver-operated mode in which a driving operation is performed by a driver and traveling in a driverless mode in which automated driving is performed without a driver's driving operation.

Further, vehicle 100 is configured to obtain advertisement data from server 200 and provide the obtained advertisement data to the outside of the vehicle. Advertisement may be provided by display or by voice. The present embodiment describes an example in which advertisement data is displayed on a windowpane of vehicle 100. The configuration of vehicle 100 will be described in detail later.

Server 200 communicates with each vehicle 100 through communication network 500, and sends and receives various types of information to and from each vehicle 100. In the present embodiment, vehicle 100 can display the advertisement obtained from server 200 to the outside of the vehicle as described above, and server 200 manages vehicles 100 on which an advertisement is displayed and advertisements to be displayed on vehicles 100. The configuration of server 200 will also be described in detail later.

Figure 2:
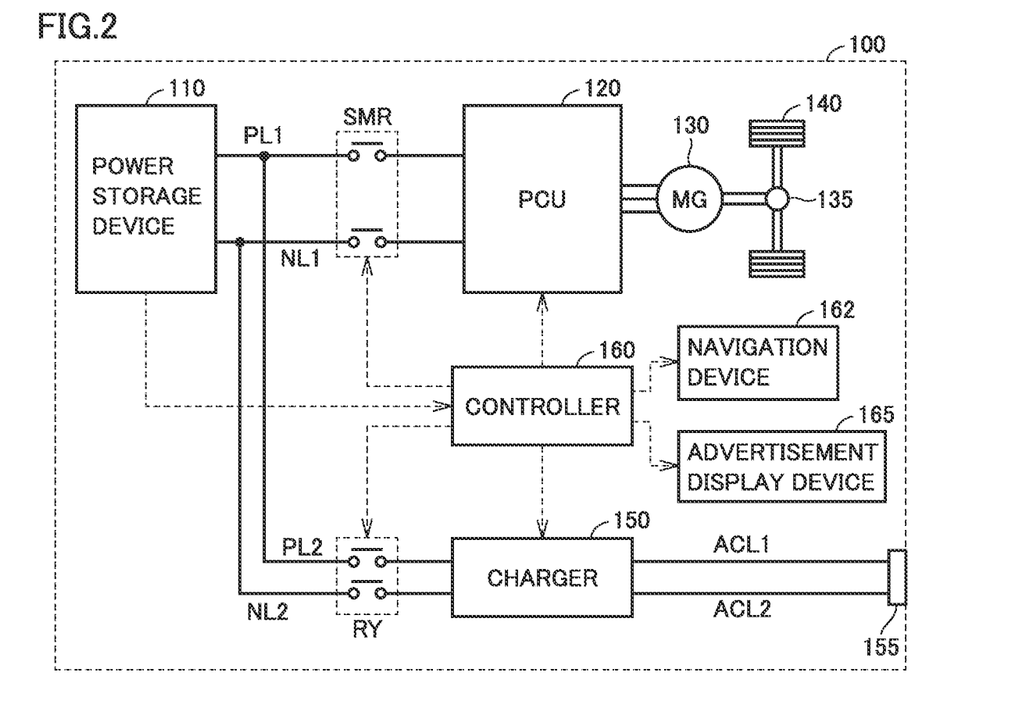
FIG. 2 shows an example of a configuration of a vehicle.

FIG. 2 shows an example of a configuration of vehicle 100. With reference to FIG. 2, vehicle 100 includes a power storage device 110, a system main relay SMR, a PCU (Power Control Unit) 120, a motor generator 130, a power transmission gear 135, and driving wheels 140. Vehicle 100 further includes a charger 150, an inlet 155, a charging relay RY, a controller 160, a navigation device 162, and an advertisement display device 165.

Power storage device 110 is a power storage component configured to be chargeable/dischargeable. Power storage device 110 includes a secondary battery such as a lithium ion battery or a nickel-hydrogen battery, or includes a power storage element such as an electric double layer capacitor, for example. Power storage device 110 outputs, to controller 160, detection values of voltage and current of power storage device 110 detected by a sensor (not shown).

PCU 120 is a driving device for driving motor generator 130, and includes a power converting device such as a converter, an inverter, or the like (all not shown). PCU 120 is controlled by controller 160 and converts DC power received from power storage device 110 into AC power for driving motor generator 130.

Motor generator 130 is an AC rotating electrical machine, such as a permanent-magnet type synchronous motor including a rotor having a permanent magnet embedded therein. Output torque from motor generator 130 is transmitted to driving wheels 140 via power transmission gear 135, which is constituted of a speed reducer and a power split device. In this way, vehicle 100 travels. Moreover, motor generator 130 is capable of generating electric power using rotation power of driving wheels 140 when vehicle 100 operates for braking. The electric power thus generated is converted by PCU 120 into charging power for power storage device 110.

It should be noted that in a hybrid vehicle including an engine (not shown) in addition to motor generator 130, required vehicle driving power is generated by operating the engine and motor generator 130 cooperatively. In this case, power storage device 110 can also be charged using electric power generated by rotation of the engine.

Charger 150 is connected to power storage device 110 through charging relay RY. Moreover, charger 150 is connected to inlet 155 by power lines ACL1, ACL2. Charger 150 converts electric power supplied from the power supply, which is external to the vehicle and is electrically connected to inlet 155, into electric power with which power storage device 110 can be charged.

Navigation device 162 includes a GPS receiver (not shown) configured to specify a location of vehicle 100 based on electric waves from satellites (not shown). Navigation device 162 performs various types of navigation processes of vehicle 100 using the location information (GPS information) on vehicle 100 specified by the GPS receiver. Specifically, navigation device 162 calculates a traveling route from the current location of vehicle 100 to a destination based on GPS information of vehicle 100 and road map data stored in the memory (not shown), and outputs information on the target route to controller 160.

Controller 160 includes an ECU (Electronic Control Unit), various sensors, a communication module, and the like (not shown in FIG. 2), receives signals from the various sensors, outputs a control signal to each device, and controls vehicle 100 and each device. Controller 160 performs various types of control for performing driverless driving of vehicle 100 (such as driving control, braking control, and steering control). Controller 160 generates control signals for controlling PCU 120, a steering device (not shown), charger 150, and the like.

<Advertisement Providing Method Using Vehicle 100>

Various types of services utilizing a movable body capable of driverless driving, such as vehicle 100, have been under study. In a conceivable service, vehicle 100 capable of driverless driving is dispatched to a user, and the user uses vehicle 100 to a destination (e.g., station) and then deadheads vehicle 100 to a waiting area by driverless driving. In such a case, effective use of vehicle 100 during traveling by driverless driving, such as during deadheading, is desired.

In the present embodiment, thus, vehicle 100 capable of traveling in the driver-operated mode and traveling in the driverless mode includes advertisement display device 165 that provides an advertisement to the outside of vehicle 100 during traveling in the driverless mode. This allows vehicle 100 traveling in the driverless mode to be utilized effectively as an advertisement medium.

Advertisement display device 165 is configured to display an advertisement on a windowpane of vehicle 100 to the outside of vehicle 100. Advertisement display device 165 can switch between a state to display an advertisement on a windowpane (first state) and a state to display no advertisement (second state) in response to a control signal from controller 160. For example, various types of display techniques such as transparent liquid crystal display and transparent organic EL display can be used to display an advertisement on a windowpane of vehicle 100 by advertisement display device 165.

Advertisement display device 165 subsequently enters the state in which an advertisement is displayed on a windowpane (first state) during driverless mode and enters the state in which no advertisement is displayed (second state) during the driver-operated mode in response to a control signal from controller 160.

Figure 3:
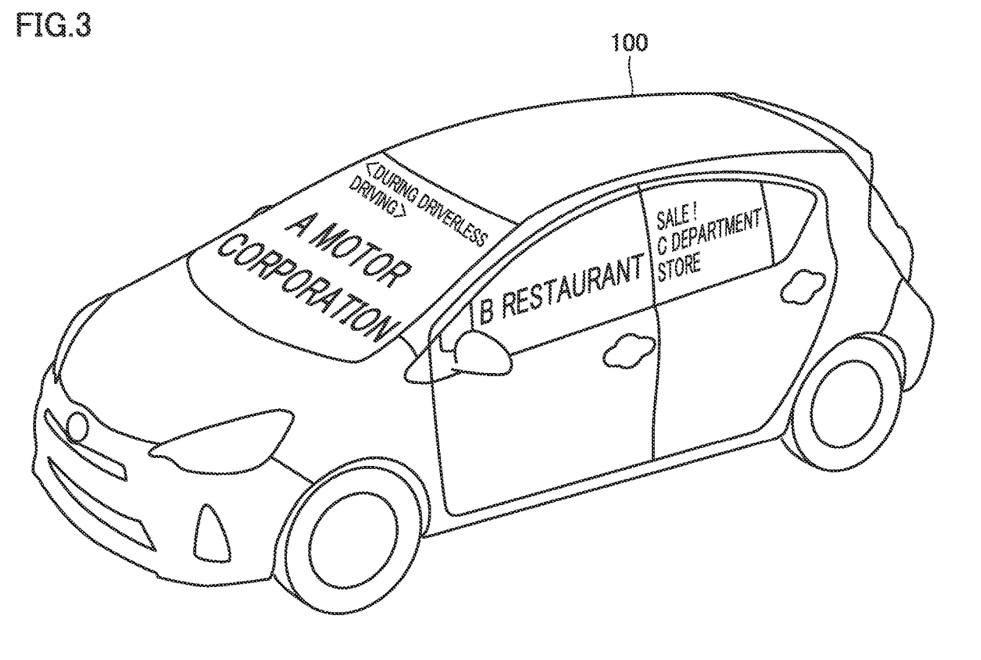
FIG. 3 shows a display example of an advertisement in a vehicle traveling in a driverless mode.

FIG. 3 shows a display example of advertisements in vehicle 100 traveling in the driverless mode. With reference to FIG. 3, during traveling in the driverless mode, advertisements directed outside of vehicle 100 are displayed on windowpanes of vehicle 100 by advertisement display device 165. The content of the advertisement (advertisement data) is obtained from server 200 (not shown). It should be noted that no advertisement is displayed during traveling in the driver-operated mode.

Figure 4:
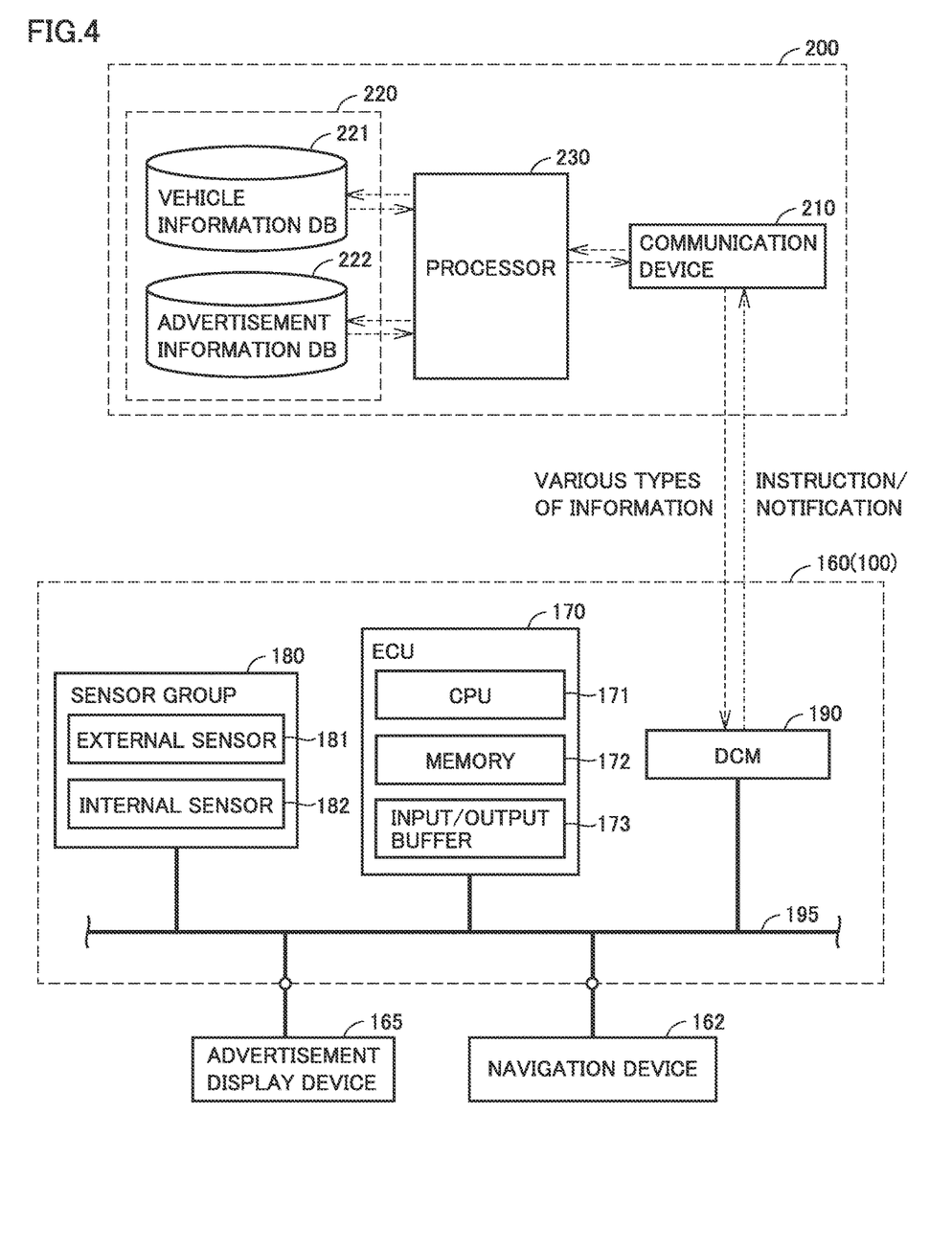
FIG. 4 shows configurations of a controller of the vehicle and a server in greater detail.

FIG. 4 shows configurations of controller 160 of vehicle 100 and server 200 in greater detail. With reference to FIG. 4, controller 160 of vehicle 100 includes an ECU 170, a sensor group 180, and a communication module 190. ECU 170, sensor group 180, and communication module 190 as well as navigation device 162 and advertisement display device 165 are connected to one another via an in-vehicle wired network 195 such as a CAN (Controller Area Network).

ECU 170 includes a CPU (Central Processing Unit) 171, a memory 172, and an input/output buffer 173. In response to a signal from each sensor of sensor group 180, ECU 170 controls devices to bring vehicle 100 into a desired state. For example, in the driverless mode in which vehicle 100 is caused to travel by driverless driving, ECU 170 performs various types of control for implementing the automated driving of vehicle 100 by controlling PCU 120 (FIG. 2) serving as a driving device and the steering device (not shown).

It should be noted that "driverless driving" in the driverless mode refers to driving in which driving operations of vehicle 100 such as acceleration, deceleration, and steering are performed without use's driving operations. Specifically, this vehicle 100 is configured to perform full-automated driving defined as "Level 5". That is, in the automated driving by ECU 170, a driver does not need to ride on the vehicle under all the situations.

Therefore, controller 160 includes sensor group 180 to detect situations inside and outside vehicle 100. Sensor group 180 includes an external sensor 181 configured to detect a situation outside vehicle 100, and an internal sensor 182 configured to detect information corresponding to a traveling state of vehicle 100 and detect a steering operation, an accelerating operation, and a braking operation.

External sensor 181 includes a camera, a radar, a LIDAR (Laser Imaging Detection And Ranging), and the like, for example (all not shown). The camera captures an image of a situation outside vehicle 100 and outputs, to ECU 170, captured-image information regarding the situation outside vehicle 100. The radar transmits electric wave (for example, millimeter wave) to surroundings of vehicle 100 and receives electric wave reflected by an obstacle to detect the obstacle. Then, the radar outputs, to ECU 170, a distance to the obstacle and a direction of the obstacle as obstacle information regarding the obstacle. The LIDAR transmits light (typically, ultraviolet rays, visible rays, or near infrared rays) to surroundings of vehicle 100 and receives light reflected by an obstacle to measure a distance to the reflecting point and detect the obstacle. The LIDAR outputs, to ECU 170, the distance to the obstacle and a direction of the obstacle as obstacle information, for example.

Internal sensor 182 includes a vehicle speed sensor, an acceleration sensor, a yaw rate sensor, and the like, for example (all not shown). The vehicle speed sensor is provided at a wheel of vehicle 100 or a drive shaft that is rotated together with the wheel, detects a rotating speed of the wheel, and outputs vehicle speed information including the speed of vehicle 100 to ECU 170. The acceleration sensor includes a forward/backward acceleration sensor configured to detect acceleration in a forward/backward direction of vehicle 100, and a lateral acceleration sensor configured to detect lateral acceleration of vehicle 100, for example. The acceleration sensor outputs acceleration information including both the accelerations to ECU 170. The yaw rate sensor detects a yaw rate (rotation angle speed) around the vertical axis of the center of gravity of vehicle 100. The yaw rate sensor is, for example, a gyro sensor, and outputs yaw rate information including the yaw rate of vehicle 100 to ECU 170.

ECU 170 further obtains advertisement information through communication module 190 from server 200 during traveling in the driverless mode, and controls advertisement display device 165 to display advertisement data included in the obtained advertisement information (FIG. 2). In contrast, ECU 170 prohibits display of an advertisement by advertisement display device 165 during the driver-operated mode. It should be noted that ECU 170 may obtain advertisement information through communication module 190 from server 200 irrespective of a driving mode, and display an advertisement by advertisement display device 165 in the driverless mode and prohibit display of an advertisement in the driver-operated mode.

Communication module 190 is an in-vehicle DCM (Data Communication Module), and is configured to perform bidirectional data communication with communication device 210 of server 200 via communication network 500 (FIG. 1).

Server 200 includes a communication device 210, a storage device 220, and a processor 230. Communication device 210 is configured to perform bidirectional data communication with communication module 190 of vehicle 100 via communication network 500 (FIG. 1).

Storage device 220 includes a vehicle information database (DB) 221 and an advertisement information database (DB) 222. Vehicle information DB 221 stores information of each vehicle 100 utilized by this advertisement providing system 10. Each vehicle 100 utilized by advertisement providing system 10 can be utilized by advertisement providing system 10 through a registration procedure performed in advance, and information of the registered vehicle 100 is stored in vehicle information DB 221.

Advertisement information DB 222 stores advertisement information about an advertisement to be displayed on each vehicle 100 which is registered in vehicle information DB 221. For example, advertisement information DB 222 stores information such as advertisement data indicating the content of an advertisement, a display location (e.g., windshield/rear window/side window) in vehicle 100, a display time slot, a display frequency, a display priority, a vehicle 100 to be used in display of the advertisement, and the like for each advertisement. The user who wishes the provision of an advertisement using vehicle 100 can make a utilization application in advance to utilize advertisement providing system 10. The user can set advertisement data, a display location in vehicle 100, a display time slot, a display frequency, a display priority, and the like in accordance with an advertisement fee in making a utilization application, allowing such various types of information to be registered in advertisement information DB 222 as advertisement information.

Processor 230 transmits each piece of advertisement information stored in advertisement information DB 222 to vehicle 100 in response to a request from a vehicle that is a vehicle 100 registered in vehicle information DB 221 and is traveling in the driverless mode.

An advertisement display area may be included in the advertisement information. Location information may be transmitted from a vehicle 100 traveling in the driverless mode to server 200, and the advertisement information may be transmitted to vehicle 100 traveling a registered display area in the driverless mode.

A vehicle 100 registered in vehicle information DB 221 and advertisement information stored in advertisement information DB 222 may be associated with each other in advance. That is, an advertisement stored in advertisement information DB 222 and a vehicle 100 on which the advertisement is displayed may be associated with each other. Alternatively, the number of pieces of advertisement information transmitted simultaneously to vehicle 100 may be limited, and the pieces of advertisement information to be transmitted to vehicle 100 may be prioritized in accordance with an advertisement fee paid in utilization application or the like.

Figure 5:
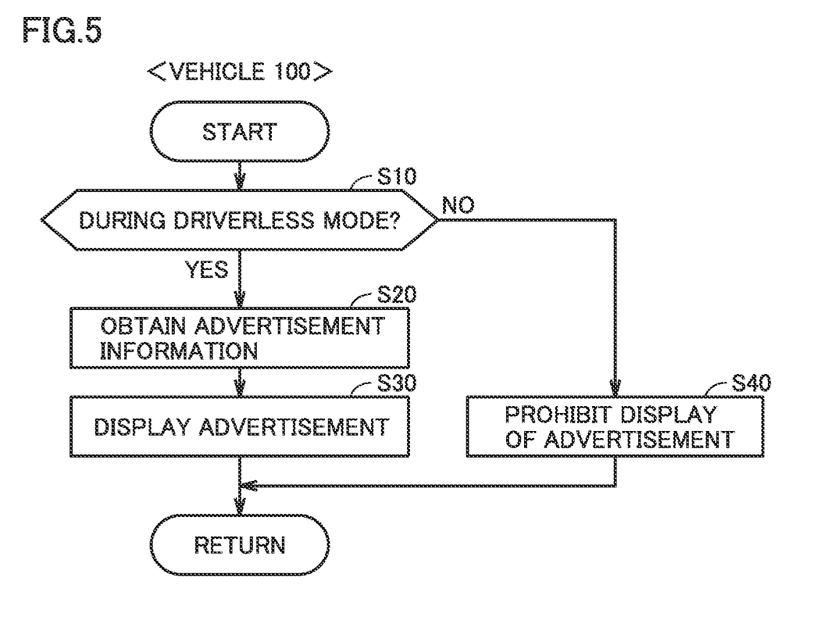
FIG. 5 is a flowchart for illustrating a procedure of processes performed by a controller of the vehicle.

FIG. 5 is a flowchart for illustrating a procedure of processes performed by controller 160 of vehicle 100. A series of processes shown in this flowchart are repeatedly performed regularly while vehicle 100 is in operation.

With reference to FIG. 5, controller 160 of vehicle 100 determines whether the driving mode is the driverless mode (step S10). When the driving mode is the driverless mode (YES in step S10), controller 160 requests server 200 to transmit advertisement information and obtains advertisement information from server 200 (step S20). This advertisement information includes data on an advertisement to be displayed, as well as an advertisement display location (e.g., windshield/rear window/side window) in the vehicle, a display time slot, a display frequency, and the like. The advertisement information to be obtained may be plural or single in accordance with the number of advertisements stored in advertisement information DB 222.

Controller 160 subsequently controls advertisement display device 165 to display an advertisement in accordance with the obtained advertisement information (step S30). When there are a plurality of advertisements to be displayed, the respective advertisements are appropriately displayed in order in consideration of a display location, a display frequency, a display priority, and the like included in each piece of advertisement information. In contrast, when determining in step S10 that the driving mode is the driver-operated mode (NO in step S10), controller 160 prohibits display of an advertisement by advertisement display device 165 (step S40).

As described above, according to the present embodiment, an advertisement is provided to the outside of vehicle 100 by advertisement display device 165 during traveling in the driverless mode, thus allowing vehicle 100 traveling in the driverless mode to be utilized effectively as an advertisement medium.

According to the present embodiment, an advertisement can be displayed on a windowpane of vehicle 100 to display the advertisement large in a conspicuous place of vehicle 100, leading to a profound advertising effect. In contrast, a display of an advertisement by advertisement display device 165 is prohibited during traveling in the driver-operated mode. Traveling in the driver-operated mode by a driver is accordingly not hindered.

First Modification

When there is an occupant during traveling in the driverless mode and the occupant requests provision of an advertisement in vehicle 100, display of an advertisement, on which an occupant's intension is reflected, may be performed by advertisement display device 165.

Figure 6:
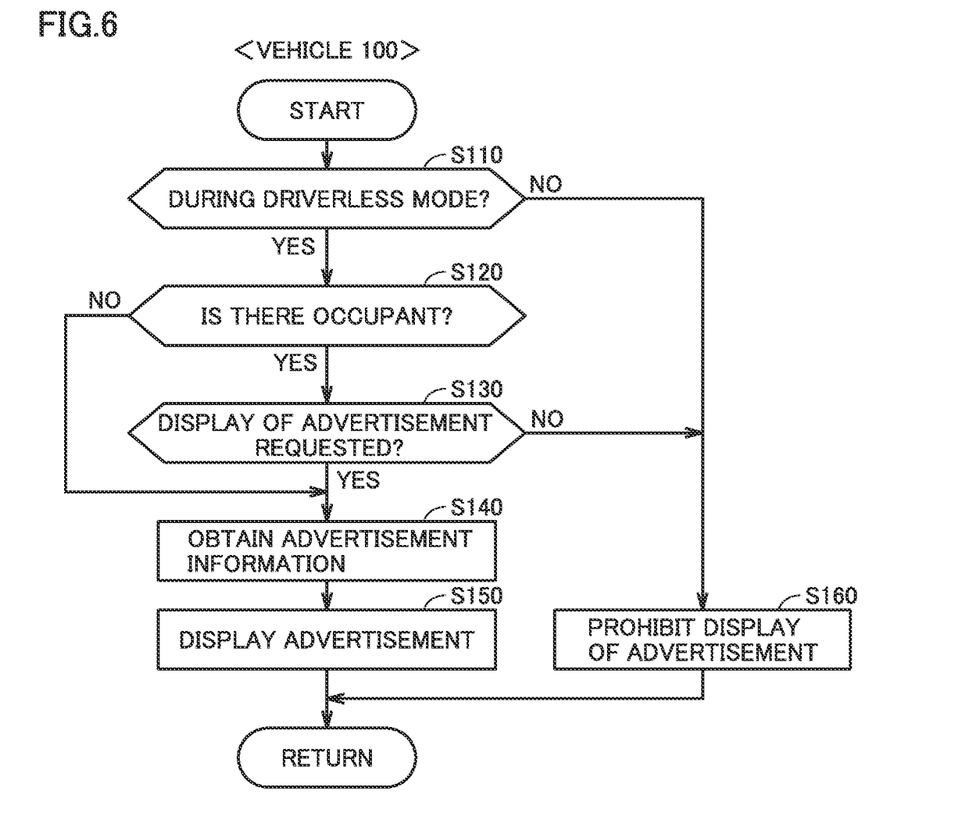
FIG. 6 is a flowchart for illustrating a procedure of processes performed by a controller of a vehicle in a first modification.

FIG. 6 is a flowchart for illustrating a procedure of processes performed by controller 160 of vehicle 100 in the first modification. A series of processes shown in this flowchart are also repeatedly performed regularly while vehicle 100 is in operation.

With reference to FIG. 6, controller 160 of vehicle 100 determines whether the driving mode is the driverless mode (step S110). When vehicle 100 is during the driverless mode (YES in step S110), controller 160 determines whether there is an occupant in the vehicle (step S120). The presence or absence of an occupant may be detected by a seating sensor or the like, or may be detected by, for example, a camera capable of capturing an image of the inside of a vehicle.

When determining that there is an occupant in step S120 (YES in step S120), controller 160 determines whether display of an advertisement by advertisement display device 165 is requested by the occupant (step S130). For example, when a switch (not shown) for requesting display of an advertisement by advertisement display device 165 is operated by the occupant, controller 160 can regard that the occupant has requested display of an advertisement.

When determining that display of an advertisement by advertisement display device 165 has been requested by the occupant (YES in step S130), controller 160 proceeds to step S140, and obtains advertisement information from server 200. Also when determining that there is no occupant in step S120 (NO in step S120), controller 160 proceeds to step S140 without performing the process of step S130, and obtains advertisement information from server 200. Since the processes performed in step S140 and step S150 are identical to the processes performed in step S20 and step S30, respectively, shown in FIG. 5, description thereof will not be repeated.

In contrast, when determining that vehicle 100 is during the driver-operated mode in step S110 (NO in step S110) or when display of an advertisement has not been requested by the occupant in step S130 (NO in step S130), controller 160 prohibits display of an advertisement by advertisement display device 165 (step S160).

According to the first modification, display of an advertisement by advertisement display device 165 is performed when an occupant requests provision of an advertisement during traveling in the driverless mode, as described above. This allows an intention of a user riding on vehicle 100 during the driverless mode to be reflected on display of an advertisement using vehicle 100 traveling in the driverless mode.

Second Modification

Advertisements to be displayed by advertisement display device 165 may be distinguished from one another according to a traveling area travelled in the driverless mode. For example, advertisement display device 165 may display an advertisement for a commercial area (e.g., a gaudy, conspicuous advertisement) when the traveling area travelled in the driverless mode is a commercial area, and advertisement display device 165 may display an advertisement for a housing area (e.g., a subdued advertisement) when the traveling area is a housing area.

Figure 7:
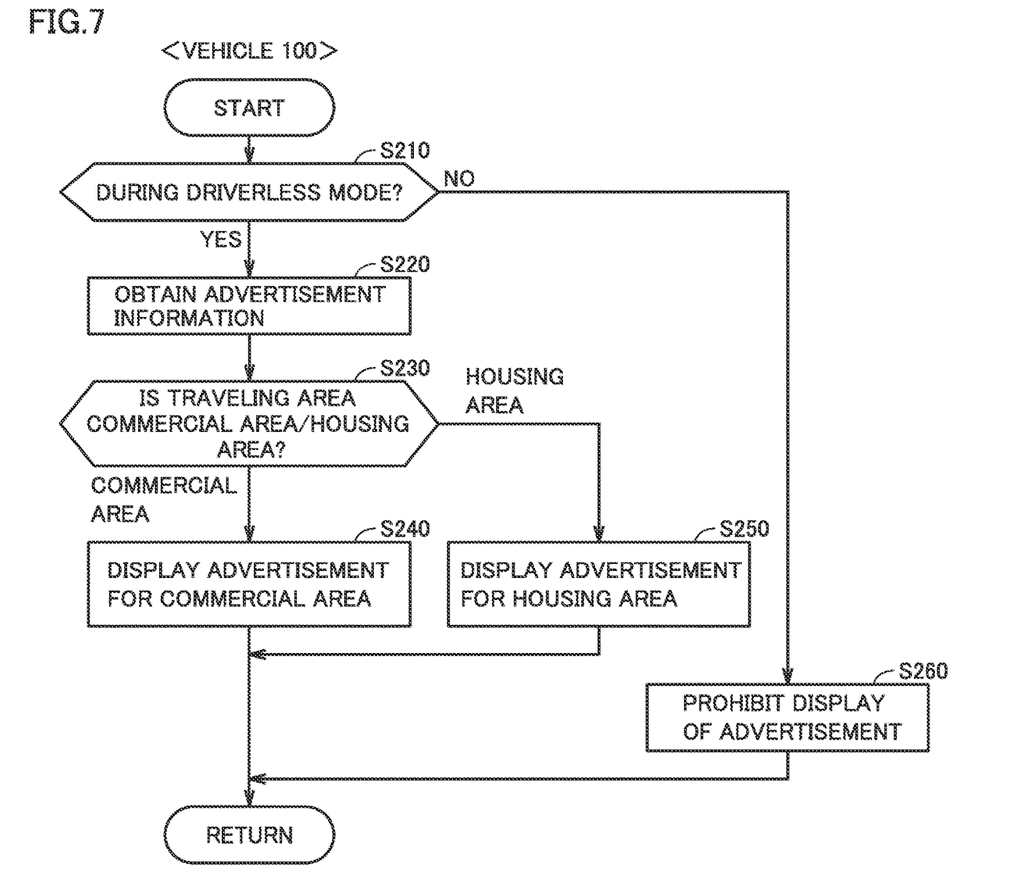
FIG. 7 is a flowchart for illustrating a procedure of processes performed by a controller of a vehicle in a second modification.

FIG. 7 is a flowchart for illustrating a procedure of processes performed by controller 160 of vehicle 100 in a second modification. A series of processes shown in this flowchart are also repeatedly performed regularly while vehicle 100 is in operation.

With reference to FIG. 7, since the processes performed in step S210 and step S220 are identical to the processes performed in step S10 and step S20, respectively, shown in FIG. 5, description thereof will not be repeated.

When the advertisement information is obtained from server 200 in step S220, controller 160 of vehicle 100 determines whether the area currently traveled by vehicle 100 is a commercial area or a housing area (step S230). The commercial area and the housing area are determined in advance in map information of navigation device 162, and controller 160 can determine whether the traveling area is a commercial area or a housing area using the map information of navigation device 162.

When determining that the traveling area is a commercial area in step S230, controller 160 controls advertisement display device 165 to display an advertisement for a commercial area of the advertisement information obtained in step S220 (step S240). For example, controller 160 controls advertisement display device 165 to display a relatively gaudy, conspicuous advertisement of the advertisement information obtained in step S220. Alternatively, a user may designate whether an advertisement is directed for a commercial area or a housing area in applying for utilization of advertisement providing system 10, and controller 160 may designate that an advertisement is directed for a commercial area according to the designation.

In contrast, when determining that the traveling area is a housing area in step S230, controller 160 controls advertisement display device 165 to display an advertisement for a housing area of the advertisement information obtained in step S220 (step S250). For example, controller 160 controls advertisement display device 165 to display a relatively subdued advertisement of the advertisement information obtained in step S220. Alternatively, controller 160 may determine that an advertisement is directed to a housing area in accordance with the user's designation in utilization application.

In contrast, when determining that the driving mode is the driver-operated mode in step S210 (NO in step S210), controller 160 prohibits display of an advertisement by advertisement display device 165 (step S260).

Although description has been made that an advertisement for a housing area is displayed when the traveling area is the housing area, no advertisement may be displayed when the traveling area is the housing area. That is, advertisement display device 165 may display an advertisement only when a vehicle travels the commercial area in which many people see an advertisement and an advertising effect is profound in the driverless mode.

The second modification can provide an advertisement having a profound advertising effect in an area travelled by vehicle 100 in the driverless mode.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A movable body that selectively travels in a driver-operated mode or a driverless mode, the movable body comprising:
   a communication interface configured to perform bidirectional data communication with a server;
   a navigation device that obtains location information on the movable body;
   a display; and
   a controller configured to:
     determine whether a driving mode is the driver-operated mode or the driverless mode; and
     based on determining that the driving mode is the driverless mode:
       control the communication interface to obtain advertisement information;
       determine whether a traveling area is a commercial area or a housing area; and
       control the display to display an advertisement that varies based on whether the traveling area is the commercial area or the housing area, wherein
       the display is on the windowpane,
       the navigation device has map information in which the commercial area and the housing area are determined in advance,
       the advertisement information includes advertisement data for the commercial area and advertisement data for the housing area,
       based on determining that the driving mode is the driverless mode and that an area currently traveled by the movable body is the commercial area based on the location information, the controller is further configured to control the display to display, on the windowpane, the advertisement data for the commercial area which is included in the advertisement information, and
       based on determining that the driving mode is the driverless mode and that an area currently traveled by the movable body is the housing area based on the location information, the controller is further configured to control the display to display, on the windowpane, the advertisement data for the housing area which is included in the advertisement information.

2. The movable body according to claim 1, wherein the advertisement information includes data on an advertisement displayed by the display, a display location of the advertisement on the movable body, and information on at least one of a display time slot of the advertisement, a display frequency, or a display priority.

3. The movable body according to claim 1, further comprising a sensor that detects whether there is an occupant in the movable body, wherein when determining that the driving mode is the driverless mode and detecting that there is an occupant in the movable body based on a detection result of the sensor, the controller is further configured to:
control the display to a switch; and
based on the occupant operating the switch, control the display to display the advertisement that varies based on whether the traveling area is the commercial area or the housing area.

4. The movable body according to claim 1, wherein the advertisement for the commercial area is a more gaudy, conspicuous advertisement than the advertisement for the housing area.

5. An advertisement providing system comprising:
a movable body that selectively travels in a driver-operated mode or a driverless mode; and
a server that communicates with the movable body, wherein
the movable body includes
a communication interface that performs bidirectional data communication with the server;
a navigation device that obtains location information on the movable body;
a display; and
a controller configured to:
determine whether a driving mode is the driver-operated mode or the driverless mode; and
based on determining that the driving mode is the driverless mode:
control the communication interface to obtain advertisement information from the server;
determine whether a traveling area is a commercial area or a housing area; and
control the display to display an advertisement that varies based on whether the traveling area is the commercial area or the housing area,
the display is on the windowpane,
the server includes a memory that stores advertisement information,
the navigation device had map information in which the commercial area and the housing area are determined in advance,
the advertisement information includes advertisement data for the commercial area and advertisement data for the housing area,
based on determining that the driving mode is the driverless mode and that an area currently traveled by the movable body is the commercial area based on the location information, the contoller if further configured to control the display to display, on the windowpane, the advertisement data for the commercial area which is included in the advertisement information, and
based on determining that the driving mode is the driverless mode and that an area currently traveled by the movable body is the housing area based on the location information, the controller is further configured to control the display to display, on the windowpane, the advertisement data for the housing area which is included in the advertisement information.

* * * * *